United States Patent [19]

Hattori et al.

[11] Patent Number: 4,749,521

[45] Date of Patent: Jun. 7, 1988

[54] PROCESS FOR PREPARING 1,4-DIAMINOANTHRAQUINONE-2,3-DISUBSTITUTED COMPOUND

[75] Inventors: Makoto Hattori; Satoshi Kajitani, both of Osaka, Japan

[73] Assignee: Sumitomo Chemical Company, Ltd., Osaka, Japan

[21] Appl. No.: 867

[22] Filed: Jan. 6, 1987

[30] Foreign Application Priority Data

Jan. 7, 1986 [JP] Japan .................................. 61-1913
Jan. 7, 1986 [JP] Japan .................................. 61-1914

[51] Int. Cl.$^4$ .................... C07C 97/24; C07C 143/665
[52] U.S. Cl. ...................................... 260/371; 260/378
[58] Field of Search ................................ 260/371, 378

[56] References Cited

U.S. PATENT DOCUMENTS 4,519,947 5/1985 Hattori et al. ...................... 260/371

FOREIGN PATENT DOCUMENTS 0105762 4/1984 European Pat. Off. ............ 260/371

Primary Examiner—Richard L. Raymond
Assistant Examiner—Raymond K. Covington
Attorney, Agent, or Firm—Cushman, Darby & Darby

[57] ABSTRACT

1,4-Diaminoanthraquinone-2,3-disulfonic acid or salt thereof and 1,4-diaminoanthraquinone-2,3-dinitrile which are intermediate of anthraquinone dyes are economically prepared by allowing 1,4-diamino-2,3-dihalogenoanthraquinone to react with alkalimetal sulfite in aqueous solution in the presence of quaternary ammonium or phosphonium compound, while water is being removed, to obtain 1,4-diaminoanthraquinone-2,3-disulfonic acid or salt thereof and, if necessary, cyanogenating the reaction mixture above without removing the disulfonic acid or salt thereof produced above to obtain 1,4-diaminoanthraquinone-2,3-dinitrile. The quaternary ammonium or phosphonium compound is recovered from and re-used for the reactions above.

23 Claims, No Drawings

PROCESS FOR PREPARING 1,4-DIAMINOANTHRAQUINONE-2,3-DISUBSTITUTED COMPOUND

The present invention relates to an improvement in production of 1,4-diaminoanthraquinone-2,3-disulfonic acid or salts thereof (both may hereinafter be referred to as "disulfonic acid") and 1,4-diaminoanthraquinone-2,3-dinitrile (hereinafter may be referred to as "dinitrile") which are anthraquinone intermediates especially useful in dye industries.

For production of the disulfonic acid, there has been known a process which comprises allowing 1,4-diamino-2,3-dihalogenoanthraquinone (hereinafter may be referred to as "dihalogenoanthraquinone") to react under heating with an alkali metal sulfite in the presence of a quaternary ammonium compound or a quaternary phosphonium compound in an aqueous medium. (published examined Japanese patent application No. 46108/85.) This process is advantageous in that the desired disulfonic acid can be obtained from the dihalogenoanthraquinone through only one step, but has the following defects. That is, the quaternary compounds used for the reaction should be recovered, purified and reused, because they are expensive. To this effect, after separating the disulfonic acid by filtration, an alkali is added to the fitrate to recover the quaternary compound as it is. Alternatively, an organic solvent is added to the filtrate to obtain the quaternary compound as its hydroxide, which is then subjected to extraction with acidic water (published examined Japanese patent application No. 46108/85, more specifically published unexamined Japanese patent application No. 171940/82). However, the re-use of the quaternary compound recovered in this manner causes considerable reduction in yield of the objective disulfonic acid.

For production of dinitrile, there has been known a process according to which in the same manner as above the dihalogenoanthraquinone is allowed to react with an alkali metal sulfite under heating in the presence of a quaternary ammonium compound or a quaternary phosphonium compound in an aqueous medium and then successively the reaction product is allowed to react with a cyanogenating agent. (published unexamined Japanese patent application No. 65064/84). This process is advantageous in that the objective dinitrile can be obtained through two steps from the dihalogenoanthraquinone, but also has the defects as encountered in the production of the disulfonic acid. (published unexamined Japanese patent application Nos. 65064/84 and 171940/82).

The present inventors have undertaken extensive studies to improve the afore-mentioned conventional processes, and found that the desired disulfonic acid and nitrile can be produced in a high yield even when the quaternary compounds recovered are used for the reaction between the dihalogenoanthraquinone and sulfonating agent, by carrying out the reaction while partially removing water from the reaction system.

The present invention provides (1) a process for production of 1,4-diaminoanthraquinone-2,3-disulfonic acid or salts thereof, which comprises subjecting 1,4-diamino-2,3-dihalogenoanthraquinone to sulfonation reaction in water with a sulfonating agent in the presence of at least one quaternary compound selected from quaternary ammonium compounds and quaternary phosphonium compounds, while partially removing water out of the reaction system, and (2) a process for production of 1,4-diaminoanthraquinone-2,3-dinitrile, which comprises subjecting the reaction mixture obtained by the process (1) to cyanogenation reaction with a cyanogenating agent.

The present invention is illustrated in detail below.

In the first place, the dihalogenoanthraquinone is reacted with a sulfonating agent to obtain the disulfonic acid (hereinafter this reaction being referred to as sulfonation reaction).

The dihalogenoanthraquinones used as the starting compound for the sulfonation in the present invention include 1,4-diamino-2,3-dichloroanthraquinone and 1,4-diamino-2,3-dibromoanthraquinone.

As the sulfonating agents, there may be used alkali metal sulfites such as sodium sulfite, potassium sulfites, etc. Alternatively, alkali metal hydrogensulfites such as sodium hydrogensulfite, potassium hydrogensulfite, etc. may be used. An amount of these sulfonating agents is 2 to 5, preferably 2.2 to 4.0 moles per mole of the dihalogenoanthraquinone.

The quaternary ammonium compounds used in the present invention include those represented by the following formula (I) or (II):

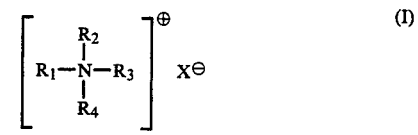

wherein $R_1$ and $R_2$ each represents an alkyl group having 1 to 24 carbon atoms or an unsubstituted or substituted benzyl group, $R_3$ and $R_4$ each represents an alkyl group having 1 to 10 carbon atoms, and X represents an anion residue,

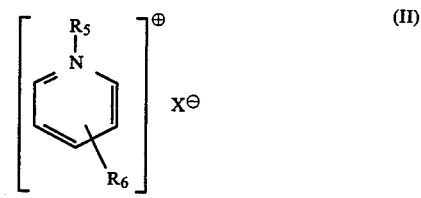

wherein $R_5$ represents an alkyl group having 1 to 24 carbon atoms, $R_6$ represents a hydrogen atom or a methyl group, and X has the same meaning as above.

As examples of the anion residues in the above formulas, mention may be made of chlorine, bromine, iodine, residues of sulfates, phosphates, acetates, methylsulfates, ethylsulfates, hydrogen-sulfates, hydrogenphosphates, dihydrogenphosphates, carbonates, hydrogencarbonates, sulfites, hydrogen-sulfites, prussiates, cyanates, thiocyanates and nitrates and a hydroxyl group.

As examples of the quaternary ammonium compounds, mention may be made of the following compounds:

tetraalkyl quaternary ammonium compounds such as tetramethyl ammonium chloride, tetraethylammonium chloride, tetra-n-propylammonium chloride, tetra-n-butylammonium chloride, teramethylammonium methylsulfate, tetraethylammonium ethylsulfate, triethylpropylammonium chloride, octyltrimethylammonium chloride, dodecyltrimethylammonium chloride, hexadecyltrimethylammonium chloride, octadecyltrimethylammonium chloride, tetracosyltrimethylammonium chloride, dioctadecyldimethylammonium chloride, diheptadecyldimethylammonium chloride, trioctylmethylammonium chloride, etc.;

benzyltrialkylammonium compounds and dibenzyldialkylammonium compounds such as benzyltrimethylammonium chloride, benzyltriethylammonium chloride, benzyltripropylammonium chloride, benzylethyldipropylammonium chloride, dodecyldimethylbenzylammonium chloride, o-, m- or p-methoxybenzyltriethylammonium chloride, o-, m- or p-chlorobenzyltriethylammonium chloride, octylbenzyldimethylammonium chloride, diethyldibenzylammonium chloride, etc.; and N-alkylpyridinium compounds and N-alkylpicolinium compounds such as N-methylpyridinium chloride, N-ethylpyridinium chloride, N-butylpyridinium chloride, N-dodecylpyridinium chloride, N-octadecylpyridinium chloride, N-methyl or butylpicolinium chloride, N-dodecylpicolinium chloride, etc.

In addition to the chlorides described above, the corresponding bromides, iodides, hydroxides, sulfates, phosphates, hydrogensulfates, acetates, methylsulfates, ethylsulfates, hydrogenphosphates, dihydrogenphosphates, carbonates, hydrogencarbonates, sulfites, hydrogensulfites, prussiates, cyanates, thiocyanates, and nitrates, and mixtures thereof may be used. Preferred are benzyltrialkylammonium compounds such as benzyltrimethylammonium chloride, benzyltriethylammonium chloride, etc.

An amount of the quaternary ammonium compound is in general 2 to 90% by weight on the basis of the total of the quaternary ammonium compound and water, though this amount may vary depending upon the kind of the quaternary compound employed. The amount is 30 to 90%, preferably 40 to 80%, for tetraalkylammonium compounds; 10 to 85%, preferably 25 to 80%, for benzyltrialkylammonium compounds and 2 to 60%, preferably 5 to 50%, for N-alkylpyridinium compound or N-alkylpicolinium compounds. For example, 20 to 75%, preferably 30 to 70% for benzyltriethylammonium chloride. When oleophilicity of the quaternary ammonium compounds is higher, the amount may be smaller than the above ranges, while the oleophilicity is lower, the amount is preferably more than the above ranges.

The quaternary phosphonium compounds used in the present invention include those represented by the following formula (III):

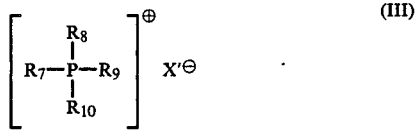

wherein $R_7$ represents an alkyl group having 1 to 24 carbon atoms, a phenyl group or a benzyl group, and $R_8$, $R_9$ and $R_{10}$ each represents an alkyl group having 1 to 24 carbon atoms or a phenyl group, and $X'$ represents an anion residue.

As examples of the anion residues in the formula (III) mention may be made of chlorine, bromine, iodine, residues of sulfates, phosphates, acetates, hydrogensulfates, hydrogenphosphates, dihydrogenphosphates, carbonates, hydrogencarbonates, sulfites, hydrogensulfites, prussiates, cyanates, thiocyanates and nitrates and a hydroxyl group.

As examples of the quaternary phosphonium compounds, mention may be made of the following compounds:

tetraalkylphosphonium compounds such as tetramethylphosphonium chloride, tetraethylphosphonium chloride, tetrabutylphosphonium chloride, octyltriethylphosphonium chloride, hexadecyltriethylphosphonium chloride, hexadecyltributylphosphonium chloride, dodecyltrimethylphosphonium chloride, triocylethylphosphonium chloride, tetracosyltriethylphosphonium chloride, etc.;

benzyltrialkylphosphonium compounds such as benzyltriethylphosphonium chloride, benzyltributylphosphonium chloride, etc.;

alkyltriphenylphosphonium compounds such as methyltriphenylphosphonium chloride, ethyltriphenylphosphonium chloride, etc., and tetraphenylphosphonium chloride.

In addition to the chlorides described above, the corresponding bromides, iodides, hydroxides, sulfates, phosphates, acetates, hydrogensulfates, hydrogenphosphates, dihydrogenphosphates, carbonates, hydrogencarbonates, sulfites, hydrogensulfites, prussiates, cyanates, thiocyanates and nitrates, and mixtures thereof may be used.

An amount of the quaternary phosphonium compound is in general 2 to 90% by weight on the basis of the total of the quaternary phosphonium compound and water, though the amount may vary depending on the kind of the quaternary phosphonium compound employed. The amount is 20 to 80%, preferably 25 to 75%, for tetraalkylphosphonium compounds; 5 to 75%, preferably 10 to 70%, for benzyltrialkylphosphonium compounds and 2 to 60%, preferably 5 to 50%, for alkyltriphenylphosphonium compounds. For example, 10 to 50%, preferably 15 to 45% for methyltriphenylphosphonium bromide. When oleophilicity of the quaternary phosphonium compound is higher than this, the amount may be smaller than the above ranges. For example, in the case of tetraphenylphosphonium compound, it is preferably 2 to 40%. When the oleophilicity is lower, the amount is preferably greater than the above range.

The quaternary ammonium compound and the quaternary phosphonium compound may be used in combination.

A total amount of water and the quaternary compound is suitably 2 to 30 times the weight of the dihalogenoanthraquinone. When the amount of water is relatively small, an inert organic solvent may be added to the system. The inert organic solvents are preferably water-immiscible and they may be, for example, halogenated aromatic hydrocarbons such as monochlorobenzene, 1,2-dichlorobenzene, 1,2,4-trichlorobenzene, 1,3,5-trichlorobenzene, etc. An amount of the inert organic solvent is usually 2 to 20 times the weight of the dihalogenoanthraquinone.

The pH of the sulfonation reaction may be varied within a wide range. That is, the reaction may be carried out at a pH of 4 to 11. When the pH is lower than said range, it tends to occur that sulfur dioxide is released out of the system and effective sulfonation can hardly be performed. When it is higher than the above range, 1,4-diamino-2-hydroxyanthraquinone-3-sulfonic acid is often by-produced due to hydrolysis of the product. The pH value of the reaction mixture may be controlled, for example, by adding a suitable buffer to the system. As the buffers, mention may be made of sodium carbonate, sodium phosphate, sodium hydrogencarbonate, dipotassium hydrogenphosphate, sodium dihydrogenphosphate, potassium dihydrogenphosphate, etc. Alternatively, pH may be controlled by supplying, during the reaction, a suitable alkali, e.g., sodium hydroxide, potassium hydroxide, sodium carbonate, sodium acetate and the like as they are or as an aqueous solution thereof.

The sulfonation reaction can be carried out usually at a temperature of 50° to 130° C., but preferably at 70° C. to 120° C.

The reaction can be usually completed in 1 to 20 hours.

Removal of water out of the reaction system is effected by distilling under heating under atmospheric pressure or reduced pressure. If necessary, an inert gas may be blown into the system. Alternatively, azeotropic distillation may be effected with an organic solvent. The higher distillation rate of water is, the better is. In the present invention, the distillation rate is intended to mean a removal amount of water per hour based on 1000 parts by weight of the total weight of water and the quaternary compound. The distillation rate usable in the present invention is 1 part by weight or more, preferably 30 parts by weight or more, per hour. Although a higher rate is not harmful to the reaction, a usually applied rate is from 60 to 100 parts by weight per hour to obtain a sufficient result.

As the inert gas, there may be used nitrogen gas, helium gas, argon gas, etc.

As the organic solvent for the azeotropic distillation, mention may be made of the halogenated aromatic hydrocarbons referred to hereinbefore.

During the reaction, if there occur inconveniences such as increase of viscosity caused by change in composition of the system due to distillation of water out of the system, adjustment may be made by optionally supplying water to the system.

When it is desired to isolate the objective disulfonic acid after completion of the sulfonation reaction, the reaction mixture is subjected to conventional crystallizations such as acid-precipitation, salting-out or combination thereof, and thus precipitated crystals can be separated by filtration to obtain the desired disulfonic acid of high purity.

If desired, the quaternary compound can be recovered from the filtrate in a conventional manner, preferably by addition of an alkali, and re-used for the sulfonation reaction.

Secondly, the dinitrile can be prepared in the following manner.

In the present invention, the disulfonic acid-containing reaction mixture obtained by the afore-mentioned process in accordance with the present invention is used for the reaction with a cyanogenating agent without isolation of the disulfonic acid.

The cyanogenating agents used in this reaction include cyanides of alkali metals, alkaline earth metals or ammonium, for example, sodium cyanide, potassium cyanide, ammonium cyanide, magnesium cyanide, calcium cyanide, etc. or mixtures thereof. Especially preferred are sodium cyanide and potassium cyanide. There may also be used cyanohydrins such as acetone cyanohydrin capable of producing cyanide ion in water.

The cyanogenation reaction using the disulfonic acid-containing reaction mixture obtained by the above process in accordance with the present invention can be carried out in the presence of the cyanogenating agent and quaternary compound at a pH ranging from 8 to 11, preferably 8.5 to 10.5. When the pH is lower than said range, hydrogen cyanide escapes out of the system to lose the cyanogenating agent. When the pH is higher than said range, a higher order of hydrolysis of intermediates and the desired nitrile can be undesirably accelerated during the reaction. The pH is able to control by addition of an effective amount of a buffer. As the buffer, there may be used those compounds exemplified above for the sulfonation reaction. Furthermore, the pH may also be controlled by adding dropwise a suitable acid such as a strong acid or a weak acid, e.g., hydrochloric acid, sulfuric acid, phosphoric acid, formic acid, acetic acid, propionic acid, etc.

The reaction temperature is 40° to 100° C., preferably 50° to 90° C. At a higher temperature within said range, the reaction can proceed rapidly. In this case, however the pH should preferably be set at a possible low level in order to prevent from a higher order of the hydrolysis. On the other hand, at a lower temperature within the range, the pH should be preferably be as high as possible so long as it does not exceed 11.

Examples of the quaternary compound usable in this reaction are the same as those exemplified above for the sulfonation reaction. An amount thereof may vary depending on the kind of the quaternary compound used, but in general 2 to 90% by weight on the basis of the total of the quaternary compound and water. This is 10 to 90%, preferably 15 to 80% for tetraalkylammonium compounds, 2 to 85%, preferably 2.5 to 80% for trialkylbenzylammonium compounds; 2 to 50%, preferably 5 to 40% for N-alkylpyridinium compounds; 10 to 70%, preferably 15 to 65% for tetraalkylphosphonium compounds; 2 to 70%, preferably 2.5 to 60% for benzyltrialkylphosphonium compounds; 1 to 5%, preferably 2 to 40% for alkyltriphenylphosphonium compounds. For example, in case of benzyltriethylammonium chloride, the amount is 2 to 85% preferably 2.5 to 75%. In order to adjust the concentration of the quaternary compound, water may be added to or removed from the reaction mixture after completion of the sulfonation reaction.

A dehydrogenating agent may be used for this cyanogenation reaction. The dehydrogenating agent includes, for example, organic nitrocompounds such as nitrobenzene, nitrobenzenesulfonic acid, nitrophenol, etc., sodium, potassium or ammonium salts of organic or inorganic peracids such as peracetic acid, persulfuric acid, perboric acid, perphosphoric acid, etc., hydrogen peroxide, sulfur, etc. Air oxygen may also be employed and in this case preferably ammonium molybdate or ammonium vanadate is added.

The cyanogenation reaction is usually completed in 2 to 20 hours. After completion of the reaction, excess cyanogenating agent is decomposed with sodium hypochlorite or hydrogen peroxide, followed by filtration to obtain the desired nitrile.

The quaternary compound can be recovered from the filtrate in a conventional manner as explained hereinbefore. The quaternary compounds recovered are re-used in the sulfonation reaction.

The quaternary compounds usable in the present invention may be ones recovered from the filtrate obtained after the sulfonation reaction or cyanogenation reaction as well as ones recovered from filtrates after analogous reactions disclosed, for example, in published unexamined Japanese patent application No. 65064/1984, published examined Japanese patent application No. 46108/1985 and the like.

The process of the present invention is advantageous from an economical viewpoint in that, according to the present process, even when the quaternary compound recovered is used, the desired disulfonic acid and dinitrile can be obtained with the same quality and with the same yield as when a fresh quaternary compound is used. Either yield of the disulfonic acid or dinitrile is higher than that in conventional processes wherein a fresh quaternary compound is used. Furthermore, according to the present invention, the disulfonic acid can be obtained as a solution of high concentration through one step from the dihalogenoanthraquinone, and the disulfonic acid without being isolated from the reaction system can be subjected to cyanogenation reaction to obtain the desired dinitrile.

The present invention will be further illustrated in the following examples and comparative examples where "part" and "%" are both by weight.

Purities of the disulfonic acid produced are all expressed in terms of free acid.

EXAMPLE 1

In a mixture of 55.6 parts of benzyltriethylammonium chloride and 55.6 parts of water was charged 5.50 parts of 1,4-diamino-2,3-dichloroanthraquinone of 90.9% in purity, followed by charging 7.18 parts of anhydrous sodium sulfite under well stirring and pH was adjusted to 9.2 with a 28% aqueous sodium hydroxide solution.

Pressure in the system was adjusted to 350 to 400 Torr and the mixture was heated to 90° to 95° C. under stirring to continue the reaction for 15 hours until the starting materials had nearly disappeared according to the analysis by chromatography, during which 100 parts of water was distilled out of the system at nearly a constant rate and simultaneously water in an amount corresponding to that of the distilled water was supplied to the system at a rate substantially equal to the distillation rate.

Then, the reaction mixture was filtered at 70° C. to eliminate a slight amount of insoluble matter. After being cooled, the filtrate was controlled to pH 1 with 78% sulfuric acid and the precipitated crystal was filtered off. The wet cake was washed twice with 20 parts of 1% aqueous hydrochloric acid solution and dried to obtain 7.30 parts of 1,4-diaminoanthraquinone-2,3-disulfonic acid, which had a purity of 87.7%.

To 118.4 parts of a solution obtained by combining the above filtrate and the 1% aqueous hydrochloric acid solution used first for washing was added 1.8 parts of active carbon, followed by stirring at 35° C. for 2 hours and then filtration. To the filtrate was gradually added 44 parts of 45% aqueous sodium hydroxide solution under stirring at 30° C. and this was left to stand for 1 hour and then was separated into two layers, i.e., an oil layer and an aqueous layer. Amount of the oil layer was 75 parts and content of benzyltriethylammonium chloride was 64.9%.

EXAMPLE 2

To a mixture of 85.7 parts of the oil layer obtained in EXAMPLE 1 and 25.5 parts of water was added 78% sulfuric acid to adjust pH to 7.0 In this mixture was charged 5.50 parts of 1,4-diamino-2,3-dichloroanthraquinone having a purity of 90.9% and was charged 7.18 parts of anhydrous sodium sulfite under stirring. Then, pH of the mixture was adjusted to 9.2 with 28% aqueous sodium hydroxide solution.

Pressure in the system was adjusted to 350 to 400 Torr. Thereafter, the mixture was heated to 90° to 95° C. under well stirring to continue the reaction for 15 hours until the starting material had almost disappeared according to chromatography, during which 100 parts of water was distilled out of the system at nearly a constant rate and simultaneously water in an amount corresponding to that of the water distilled was supplied to the system at a rate substantially equal to the distillation rate.

Then, the reaction mixture was filtered at 70° C. to remove a slight amount of insoluble matter. After being cooled, the filtrate was controlled to pH 1 with 78 % sulfuric acid and the precipitated crystal was filtered off. The wet cake was washed twice with 20 parts of 1% aqueous hydrochloric acid solution and dried to obtain 7.12 parts of 1,4-diaminoanthraquinone-2,3-disulfonic acid, which had a purity of 87.3%.

EXAMPLE 3

EXAMPLE 1 was repeated until completion of the sulfonation reaction.

Then, to the reaction mixture was added 0.5 part of diatomaceous earth, followed by filtration at 70° C. and the cake was washed with 28 parts of warm water and the washing water was combined with the filtrate.

In the filtrate and the washing water which had been cooled to 25° C. was charged 3.2 parts of sodium cyanide and the reaction mixture was heated to 60° to 65° C. with keeping pH at 9.4 to 9.8 with 43% aqueous phosphoric acid solution to carry out the reaction until 1,4-diaminoanthraquinone-2,3-disulfonic acid disappeared according to chromatography.

Then, excess sodium cyanide was decomposed with 35% aqueous hydrogen peroxide solution, followed by filtration and the wet cake was washed thrice with 23 parts of warm water and dried to obtain 4.64 parts of 1,4-diaminoanthraquinone-2,3-dinitrile, which had a purity of 93.3%.

The filtrate and the first washing water were combined to obtain 170 parts of a solution, to which was added 78% sulfuric acid to adjust pH to 1.5. Then, 1.7 parts of active carbon was added to the solution and this was stirred at 40° C. for 2 hours, followed by adding 62 parts of 45% aqueous sodium hydroxide solution at 40° C. under stirring and leaving to stand for 1 hour. Thereafter, the mixture was separated into an oil layer and an aqueous layer. Amount of the oil layer was 80.5 parts and content of benzyltriethylammonium chloride was 65.6%.

EXAMPLE 4

The procedure of EXAMPLE 2 was repeated using a mixture of 84.8 parts of the oil layer obtained in EXAMPLE 3 and 26.4 parts of water to obtain 7.12 parts of 1,4-diaminoanthraquinone-2,3-disulfonic acid having a purity of 87.3%.

EXAMPLE 5

To a mixture of 84.8 parts of the oil layer obtained in EXAMPLE 3 and 26.4 parts of water was added 78% sulfuric acid to adjust pH to 7.0. In this mixture was charged 5.50 parts of 1,4-diamino-2,3-dichloroanthraquinone of 90.9% in purity and then was charged 7.18 parts of anhydrous sodium sulfite under well stirring. Then, pH was adjusted to 9.2 with 28% aqueous sodium hydroxide solution.

After pressure in the system was adjusted to 350 to 400 Torr, the mixture was heated to 90° to 95° C. under well stirring to carry out the reaction for 15 hours until the starting material almost disappeared according to chromatography, during which 100 parts of water was distilled out of the system at substantially a constant rate and simultaneously water in an amount corresponding to that of the distilled water was supplied to the system at a rate substantially equal to the distillation rate.

After completion of the sulfonation reaction, successively the cyanogenation reaction and the after-treatment were effected in the same manner as in EXAMPLE 3 to obtain 4.50 parts of 1,4-diaminoanthraquinone-2,3-dinitrile having a purity of 93.3%.

COMPARATIVE EXAMPLE 1

(Water was not removed in EXAMPLE 1.)

EXAMPLE 1 was repeated except that adjustment of pressure in the system was not effected and during the reaction, distillation and supply of water were not carried out, but pH was kept at 9.0 to 9.2 with 28% aqueous sodium hydroxide solution, thereby to obtain 7.12 parts of 1,4-diaminoanthraquinone-2,3-disulfonic acid, (87.3% in purity).

COMPARATIVE EXAMPLE 2

(Water was not removed in EXAMPLE 2.)

EXAMPLE 2 was repeated with the exceptions as in COMPARATIVE EXAMPLE 1 to obtain 6.50 parts of 1,4-diaminoanthraquinone-2,3-disulfonic acid having a purity of 84.6%.

COMPARATIVE EXAMPLE 3

(Water was not removed in EXAMPLE 3.)

EXAMPLE 3 was repeated with the exceptions as in COMPARATIVE EXAMPLE 1 to obtain 4.50 parts of 1,4-diaminoanthraquinone-2,3-dinitrile having a purity of 93.3 %.

COMPARATIVE EXAMPLE 4

(Water was not removed in EXAMPLE 4.)

EXAMPLE 4 was repeated with the exceptions as in COMPARATIVE EXAMPLE 1 to obtain 6.20 parts of 1,4-diaminoanthraquinone-2,3-disulfonic acid having a purity of 85.5%.

COMPARATIVE EXAMPLE 5

(Water was not removed in EXAMPLE 5.)

EXAMPLE 5 was repeated with the exceptions as in COMPARATIVE EXAMPLE 1 to obtain 3.83 parts of 1,4-diaminoanthraquinone-2,3-dinitrile having a purity of 93.0%.

EXAMPLE 6

7.00 parts of 1,4-diamino-2,3-dibromoanthraquinone of 92.1% in purity and 50 parts of monochlorobenzene were charged in a mixture of 16.9 parts of dodecyltrimethylammonium chloride and 11.3 parts of water and then 8.0 parts of anhydrous potassium sulfite under well stirring. Pressure in this system was adjusted to 300 to 350 Torr and the mixture was heated to 90° to 95° C. under well stirring to carry out the reaction for 5 hours until the starting material almost disappeared according to chromatography, during which 30 parts of monochlorobenzene and 8.5 parts of water were distilled out of the system at nearly a constant rate and simultaneously water in an amount corresponding to that of the distilled water was supplied at a rate substantially equal to the distillation rate. During the reaction, pH of the reaction system showed 9.5 to 8.5.

Remaining monochlorobenzene was distilled out from the reaction mixture by steam distillation and insoluble matters were removed by filtration at 70° C. Then, to the filtrate was added 9.4 parts of sodium chloride and this was cooled to precipitate crystal. This crystal was filtered off and the wet cake was washed with 16 parts of 5% aqueous sodium chloride solution and dried to obtain 7.94 parts of 1,4-diaminoanthraquinone-2,3-disulfonic acid having a purity of 81.0%.

The filtrate and the washing solution were combined to obtain 42 parts of a solution, to which 78% sulfuric acid was added to adjust pH to 1.5. Then, 1.1 parts of active carbon was added to the solution and this was stirred at 30° C. for 1 hour, followed by filtration, then gradual addition of 20 parts of 45% aqueous potassium hydroxide solution at 45° C. under well stirring. The mixture was left to stand for 1 hour and thereafter was separated into two layers, an oil layer and an aqueous layer. Amount of the oil layer was 23.4 parts and content of dodecyltrimethylammonium chloride was 65.0%.

EXAMPLE 7

To a mixture of 26 parts of the oil layer obtained in EXAMPLE 6 and 2.2 parts of water was added 35% hydrochloric acid to adjust pH to 6.0. Then, in this mixture were charged 7.00 parts of 1,4-diamino-2,3-dibromoanthraquinone (92.1% in purity), and 50 parts of monochlorobenzene and further charged 8.0 parts of anhydrous potassium sulfite under well stirring. Pressure in the system was adjusted to 300 to 350 Torr and then the mixture was heated to 90° to 95° C. under well stirring to carry out the reaction for 5 hours until the starting materials almost disappeared according to chromatography, during which 30 parts of monochlorobenzene and 8.5 parts of water were distilled out of the system at nearly a constant rate and simultaneously water in an amount corresponding to that of the distilled water was supplied to the system at a rate substantially equal to the distillation rate. During the reaction, pH of the reaction system showed 9.5 to 8.5.

Then, remaining monochlorobenzene was distilled out from the reaction mixture by steam distillation, followed by filtration at 70° C. to remove insoluble matters and then subjecting to the same after-treatment as in EXAMPLE 6 to obtain 7.73 parts of 1,4-diaminoanthraquinone-2,3-disulfonic acid of 80.5% in purity.

EXAMPLE 8

EXAMPLE 6 was repeated until completion of the sulfonation reaction.

Then, remaining monochlorobenzene was distilled out from the reaction mixture by steam distillation and 0.5 part of diatomaceous earth was added to the mixture and the mixture was subjected to filtration at 70° C. after clarification.

The filtrate was cooled to 25° C., followed by charging therein 4.2 parts of potassium cyanide and 0.2 part of sodium m-nitrobenzenesulfonate. With keeping pH of the system at 9.3 to 9.6 with 30% aqueous sulfuric acid solution, the reaction mixture was heated to 65° to 70° C. to carry out the reaction until 1,4-diaminoanthraquinone-2,3-disulfonic acid disappeared according to chromatography.

Then, excess potassium cyanide was decomposed with 12% sodium hypochlorite solution, followed by filtration and the wet cake was washed thrice with 20 parts of warm water and dried to obtain 4.55 parts of 1,4-diaminoanthraquinone-2,3-dinitrile having a purity of 93.3%.

The filtrate and the first used washing solution were combined to obtain 82.8 parts of solution, to which 35% HCl was added to adjust pH to 1.0. To the solution was added 0.8 part of active carbon, followed by stirring at 35° C. for 2 hours and filtration. Thereafter, 45.2 parts of 48% aqueous potassium hydroxide solution was gradually added to the filtrate at 25° C. under stirring and this was left to stand for 1 hour. Then, this was separated into two layers, an oil layer and an aqueous layer. Amount of the oil layer was 24.0 parts and content of dodecyltrimethylammonium chloride was 67%.

EXAMPLE 9

EXAMPLE 7 was repeated using a mixture of 25.2 parts of the oil layer obtained in EXAMPLE 8 and 3.0 parts of water to obtain 7.78 parts of 1,4-diaminoanthraquinone-2,3-disulfonic acid having a purity of 80.5%.

EXAMPLE 10

To a mixture of 25.2 parts of the oil layer obtained in EXAMPLE 8 and 3.0 parts of water was added 35% hydrochloric acid to adjust pH to 6.0. Then, in the mixture were charged 7.00 parts of 1,4-diamino-2,3-dibromoanthraquinone of 92.1% in purity and 50 parts of monochlorobenzene and further charged 8.0 parts of anhydrous potassium sulfite under well stirring.

After adjusting pressure in the system to 300 to 350 Torr, the mixture was heated to 90° to 95° C. under well stirring to carry out the mixture for 5 hours until the starting material almost disappeared according to chromatography, during which 30 parts of monochlorobenzene and 8.5 parts of water were distilled out of the system at nearly a constant rate and simultaneously water in an amount corresponding to that of the distilled water was supplied into the system at a rate substantially equal to the distillation rate.

Then, remaining monochlorobenzene was distilled out from the reaction mixture by steam distillation and 0.5 part of diatomaceous earth was added to the mixture, followed by filtration at 70° C. after clarification.

Successively, cyanogenation reaction and after-treatment were carried out in the same manner as in EXAMPLE 8 to obtain 44.3 parts of 1,4-diaminoanthraquinone-2,3-dinitrile of 93.2% in purity.

COMPARATIVE EXAMPLE 6

(Water was not removed in EXAMPLE 6.)

EXAMPLE 6 was repeated except that adjustment of pressure in the system and removal of monochlorobenzene and water and supply of water in the sulfonation reaction were not carried out, thereby to obtain 7.73 parts of 1,4-diaminoanthraquinone-2,3-disulfonic acid having a purity of 80.5%.

COMPARATIVE EXAMPLE 7

(Water was not removed in EXAMPLE 7.)

EXAMPLE 7 was repeated with the exceptions as in COMPARATIVE EXAMPLE 6 to obtain 7.11 parts of 1,4-diaminoanthraquinone-2,3-disulfonic acid having a purity of 78.9%.

COMPARATIVE EXAMPLE 8

(Water was not removed in EXAMPLE 8.)

EXAMPLE 8 was repeated with the exceptions as in COMPARATIVE EXAMPLE 6 to obtain 4.43 parts of 1,4-diaminoanthraquinone-2,3-dinitrile having a purity of 93.2%.

COMPARATIVE EXAMPLE 9

(Water was not removed in EXAMPLE 9.)

EXAMPLE 9 was repeated with the exceptions as in COMPARATIVE EXAMPLE 6 to obtain 6.81 parts of 1,4-diaminoanthraquinone-2,3-disulfonic acid having a purity of 77.9%.

COMPARATIVE EXAMPLE 10

(Water was not removed in EXAMPLE 10.)

EXAMPLE 10 was repeated with the exceptions as in COMPARATIVE EXAMPLE 6 to obtain 3.84 parts of 1,4-diaminoanthraquinone-2,3-dinitrile having a purity of 92.7%.

EXAMPLE 11

In a mixture of 20 parts of methyltriphenylphosphonium bromide and 30 parts of water was charged 5.50 parts of 1,4-diamino-2,3-dichloroanthraquinone having a purity of 90.9% and was further charged 8.0 parts of anhydrous potassium sulfite under well stirring.

After adjusting pressure in the system to 580 to 600 Torr, the mixture was heated to 100° to 105° C. under well stirring to carry out the reaction for 2 hours until the starting material almost disappeared according to chromatography, during which 3.0 parts of water was distilled out of the system at nearly a constant rate while blowing nitrogen gas thereinto little by little.

After completion of the reaction, the reaction mixture was controlled until pH 1 with addition of 78% sulfuric acid and the precipitated crystal was filtered off. The wet cake was washed with 20 parts of 1% aqueous hydrochloric acid and dried to obtain 7.18 parts of 1,4-diaminoanthraquinone-2,3-disulfonic acid having a purity of 87.5%.

The filtrate and the washing solution recovered were combined to obtain 64 parts of solution. To this solution was added 0.6 part of active carbon, followed by stirring at 25° C. for 1 hour, filtration and then gradual addition of 30 parts of 48% aqueous potassium hydroxide solution at 15° C. with stirring. Then, the mixture was left to stand for 1 hour and thereafter was separated into two layers, an oil layer and an aqueous layer. Amount of the oil layer was 34 parts and content of methyltriphenylphosphonium bromide was 50.6%.

EXAMPLE 12

To a mixture of 39.5 parts of the oil layer obtained in EXAMPLE 11 and 10.5 parts of water was added 47% aqueous HBr to adjust pH to 6.0. Then, in this mixture was charged 5.50 parts of 1,4-diamino-2,3-dichloroanthraquinone having a purity of 90.9% and was further charged 8.0 parts of anhydrous potassium sulfite under well stirring.

After pressure in the system was adjusted to 580 to 600 Torr, the mixture was heated to 100° to 105° C. under well stirring to carry out the reaction for 2 hours until most of the starting material disappeared according to chromatography, during which 3.0 parts of water was distilled out of the system at almost a constant rate while blowing nitrogen gas thereinto little by little.

After completion of the reaction, the reaction mixture was controlled until pH 1 with addition of 78% sulfuric acid and the precipitated crystal was filtered off. The wet cake was washed with 20 parts of 1% aqueous hydrochloric acid and dried to obtain 7.01 parts of 1,4-diaminoanthraquinone-2,3-disulfonic acid having a purity of 87.1%.

EXAMPLE 13

EXAMPLE 12 was repeated until completion of the sulfonation reaction. Then, cyanogenation reaction was carried out in the same manner as in EXAMPLE 3. After completion of the reaction, excess sodium cyanide was decomposed with 35% aqueous hydrogen peroxide, followed by filtration and the resultant wet cake was washed thrice with 20 parts of warm water and then dried to obtain 4.58 parts of 1,4-diaminoanthraquinone-2,3-dinitrile having a purity of 93.2%.

The filtrate and the first used washing solution recovered were combined to obtain 78.6 parts of solution. To this solution was added 35% aqueous hydrochloric acid to adjust pH to 1.5 and then was added 0.8 part of active carbon, followed by stirring at 30° C. for 2 hours, then filtration and gradual addition of 18.2 parts of 96% potassium hydroxide at 30° C. under stirring. The mixture was left to stand for 1 hour and then separated into two layers, an oil layer and an aqueous layer. Amount of the oil layer was 37.3 parts and content of methyltriphenylphosphonium bromide was 51.0%.

EXAMPLE 14

EXAMPLE 12 was repeated using a mixture of 39.5 parts of the oil layer obtained in EXAMPLE 13 and 10.5 parts of water to obtain 7.01 parts of 1,4-diaminoanthraquinone-2,3-disulfonic acid having a purity of 87.1%.

EXAMPLE 15

To a mixture of 39.2 parts of the oil layer obtained in EXAMPLE 13 and 10.8 parts of water was added 47% aqueous HBr to adjust pH to 6.0. In this mixture was charged 5.50 parts of 1,4-diamino-2,3-dichloroanthraquinone having a purity of 90.9% and was charged 8.0 parts of anhydrous potassium sulfite under well stirring.

After pressure in the system was adjusted to 580 to 600 Torr, the mixture was heated to 100° to 105° C. under well stirring to carry out the reaction for 2 hours until most of the starting material disappeared according to chromatography, during which 3.0 parts of water was distilled out of the system at nearly a constant rate while gradually blowing nitrogen gas thereinto.

After completion of the sulfonation reaction, successively cyanogenation reaction and after-treatments were carried out in the same manner as in EXAMPLE 3 to obtain 4.39 parts of 1,4-diaminoanthraquinone-2,3-dinitrile having a purity of 93.2%.

EXAMPLE 16

In a mixture of 15 parts of tetrabutylphosphonium bromide and 15 parts of water were charged 7.00 parts of 1,4-diamino-2,3-dibromoanthraquinone having a purity of 92.1% and 50 parts of 1,2,4-trichlorobenzene and furthermore, 5.7 parts of anhydrous sodium sulfite under well stirring.

The mixture was heated to 110° to 115° C. under well stirring to carry out the reaction for 3 hours until the starting material almost disappeared according to chromatography, during which 4.0 parts of trichlorobenzene and 4.1 parts of water were distilled out of the system at nearly a constant rate while gradually blowing nitrogen gas thereinto.

Then, remaining trichlorobenzene was distilled out by steam distillation, followed by filtration at 80° C. to remove insoluble matters. The reaction mixture was cooled and then controlled until pH 1 with 78% sulfuric acid. The precipitated crystal was filtered off and the resultant wet cake was washed with 20 parts of 1% aqueous hydrochloric acid and dried to obtain 7.23 parts of 1,4-diaminoanthraquinone-2,3-disulfonic acid having a purity of 87.5%.

The filtrate and the washing solution recovered were combined to obtain 75 parts of solution.

Thereto was added 0.75 part of active carbon, followed by stirring at 30° C. for 1 hour, filtration and then gradually adding 14.2 parts of 96% potassium hydroxide at 35° C. under stirring. The mixture was left to stand for 1 hour and thereafter was separated into two layers, an oil layer and an aqueous layer. Amount of the oil layer was 28.2 parts and content of tetrabutylphosphonium bromide was 50.5%.

EXAMPLE 17

To a mixture of 29.7 parts of the oil layer obtained in EXAMPLE 16 and 0.3 part of water was added 78% sulfuric acid to adjust pH to 6.0. In this mixture were charged 7.00 parts of 1,4-diamino-2,3-dibromoanthraquinone having a purity of 92.1% and 50 parts of 1,2,4-trichlorobenzene and 5.7 parts of anhydrous sodium sulfite under well stirring.

The mixture was heated to 110° to 115° C. with well stirring to carry out the reaction for 3 hours until the starting material almost disappeared according to chromatography, during which 4.0 parts of trichlorobenzene and 4.1 parts of water were distilled out of the system at nearly a constant rate while gradually blowing nitrogen gas thereinto.

Then, remaining trichlorobenzene was distilled out by steam distillation, followed by filtration at 80° C. to remove insoluble matters. The reaction mixture was cooled and controlled until pH 1 with 78% sulfuric acid. The precipitated crystal was filtered off and the resultant wet cake was washed with 20 parts of 1% aqueous hydrochloric acid and dried to obtain 7.02 parts of 1,4-diaminoanthraquinone-2,3-disulfonic acid, 87.1% in purity.

EXAMPLE 18

EXAMPLE 16 was repeated until completion of the sulfonation reaction.

Thereafter, remaining trichlorobenzene was distilled off by steam distillation, followed by filtration at 80° C. to remove insoluble matters. Then, cyanogenation reaction and decomposition of excess sodium cyanide were effected in the same manner as in EXAMPLE 3, followed by filtration and the resultant wet cake was washed thrice with 15 parts of warm water and dried to obtain 4.43 parts of 1,4-diaminoanthraquinone-2,3-dinitrile, 93.2% in purity.

The filtrate and the first used wash solution recovered were combined to obtain 54 parts of solution, which was adjusted to pH 1.5 with 78% sulfuric acid. To the solution was added 0.5 part of active carbon, followed by stirring at 30° C. for 1 hour, then filtration and thereafter gradually adding 8.1 parts of 96% sodium hydroxide at 20° C. with stirring. The mixture was left to stand for 1 hour and then was separated into two layers, an oil layer and an aqueous layer. Amount of the oil layer was 28.3 parts and content of tetrabutylphosphonium bromide was 50.3%.

EXAMPLE 19

EXAMPLE 17 was repeated using a mixture of 29.7 parts of the oil layer obtained in EXAMPLE 18 and 0.3 part of water to obtain 7.02 parts of 1,4-diaminoanthraquinone-2,3-disulfonic acid, 87.1% in purity.

EXAMPLE 20

To a mixture of 29.8 parts of the oil layer obtained in EXAMPLE 18 and 0.2 part of water was added 78% sulfuric acid to adjust pH to 6.0. Then, in this mixture were charged 7.00 parts of 1,4-diamino-2,3-dibromoanthraquinone having a purity of 92.1% and 50 parts of 1,2,4-trichlorobenzene and then was charged 5.7 parts of anhydrous sodium sulfite under well stirring.

Under well stirring, said mixture was heated to 110° to 115° C. to carry out the reaction for 3 hours until the starting material almost disappeared according to chromatography, during which 4.0 parts of trichlorobenzene and 4.1 parts of water were distilled out of the system at nearly a constant rate while nitrogen gas was gradually blown thereinto.

Then, remaining trichlorobenzene was distilled off by steam distillation, followed by filtration at 80° C. to remove insoluble matters and successively cyanogenation reaction and after-treatments were effected in the same manner as in EXAMPLE 3 to obtain 4.34 parts of 1,4-diaminoanthraquinone-2,3-dinitrile, 93.0% in purity.

EXAMPLE 21

In a mixture of 35.6 parts of benzyltriethylammonium chloride and 27.0 parts of water was charged 5.50 parts of 1,4-diamino-2,3-dichloroanthraquinone, 90.9% in purity and was charged 6.43 parts of anhydrous potassium sulfite under well stirring.

After pressure in the system was adjusted to 280 Torr, the mixture was heated to 85° to 90° C. to carry out reaction for 6 hours until the starting material almost disappeared, during which 11.7 parts of water was distilled out of the system at nearly a constant rate. pH in the system showed 9.8 to 8.5.

Then, the mixture was cooled to 60° C and 10.52 parts of 25% aqueous sodium cyanide solution was charged therein. pH of the system was controlled to 9.5 to 10.0 with 30% aqueous sulfuric acid solution. The mixture was heated keeping pH unchanged to 65° to 70° C. to carry out reaction until 1,4-diaminoanthraquinone-2,3-disulfonic acid disappeared according to chromatography.

While the reaction mixture was cooled at 25° C., excess sodium cyanide was decomposed with 6.1 parts of 35% aqueous hydrogen peroxide, followed by filtration and the resultant wet cake was washed thrice with 20 parts of warm water and dried to obtain 4.77 parts of 1,4-diaminoanthraquinone-2,3-dinitrile, 93.3% in purity.

The filtrate and the first used wash water recovered were combined to obtain 80 parts of mixture. 35% Hydrochloric acid was added to said mixture to adjust pH to 1.0 and 0.8 part of active carbon was added, followed by stirring at 25° C. for 2 hours, and then filtration. To the filtrate was added gradually 43.7 parts of 48% aqueous potassium hydroxide solution under stirring and this was left to stand for 1 hour and then was separated into two layers, an oil layer and an aqueous layer. Amount of the oil layer was 49.3 parts and content of benzyltriethylammonium chloride was 65.0%.

EXAMPLE 22

To a mixture of 49.3 parts of the oil layer obtained in EXAMPLE 21, 3.6 parts of benzyltriethylammonium chloride and 9.7 parts of water was added 35% hydrochloric acid to adjust pH to 7.0 and then the same procedure as in EXAMPLE 21 was conducted to obtain the following results.

| | |
|---|---|
| Amount of 1,4-diaminoanthraquinone-2,3-dinitrile obtained | 4.73 parts |
| Purity | 93.3% |
| Amount of oil layer recovered | 49.3 parts |
| Content of benzyltriethylammonium chloride | 65.0% |

EXAMPLES 23-26

The procedure of EXAMPLE 22 was repeatedly carried out with circulating and using the recovered benzyltriethylammonium chloride. The results are shown in the following table.

| Example No. | 23 | 24 | 25 | 26 |
|---|---|---|---|---|
| Example No. of recovered oil layer used (Part) | 22 | 23 | 24 | 25 |
| Amount of the oil layer (Part) | 49.3 | 49.0 | 50.0 | 49.3 |
| Added benzyltriethylammonium chloride (Part) | 3.6 | 3.5 | 3.35 | 3.46 |
| Water (Part) | 9.7 | 10.1 | 9.25 | 9.84 |
| Amount of 1,4-diaminoanthraquinone-2,3-dinitrile obtained (Part) | 4.68 | 4.72 | 4.71 | 4.65 |
| Purity of the dinitrile (%) | 93.4 | 93.0 | 92.7 | 93.5 |
| Amount of recovered oil layer (Part) | 49.0 | 50.0 | 49.3 | 49.3 |
| Content of benzyltriethylammonium chloride (%) | 65.5 | 64.5 | 65.2 | 65.0 |

EXAMPLES 27-46

Production of 1,4-diaminoanthraquinone-2,3-disulfonic acid and -dinitrile was carried out as shown in the following table. The results are also shown in the table.

| EXAMPLE NO. | 27 | 28 | 29 | 30 | 31 | 32 |
|---|---|---|---|---|---|---|
| Quaternary | Benzyltrimethyl- | Benzyltrimethyl- | Benzyltrimethyl- | Tetra-n-butyl | Tetra-n-butyl | Tetra-n-butyl |

-continued

| compound | ammonium chloride | ammonium chloride (oil layer recovered in EXAMPLE 27) | ammonium chloride (oil layer recovered in EXAMPLE 39) | ammonium bromide | ammonium bromide (oil layer recovered in EXAMPLE 30) | ammonium bromide (oil layer recovered in EXAMPLE 41) |
|---|---|---|---|---|---|---|
| Amount | 59.5 parts | 87.5 parts | 88.4 parts | 78.7 parts | 121.0 parts | 121.0 parts |
| Water | 48.7 parts | 20.7 parts | 19.8 parts | 42.3 parts | 0 | 0 |
| Starting material | 1,4-diamino-2,3-dichloroanthraquinone (purity 90.9%) | | | 1,4-diamino-2,3-dichloroanthraquinone (purity 90.9%) | | |
| Amount | 5.50 parts | | | 5.50 parts | | |
| Sulfonating agent | Anhydrous sodium sulfite | | | Anhydrous sodium sulfinte | | |
| Amount | 5.7 parts | | | 7.18 parts | | |
| Reaction temp.(°C.) | 80–85 | | | 90–95 | | |
| Pressure (Torr) | 240–270 | | | 300–320 | | |
| Reaction time | 18 hours | | | 12 hours | | |
| Amount of distilled water | 58.5 parts (water was supplied at the same rate) | | | 65 parts (water was supplied at the same rate) | | |
| Cyanogenation After-treatments | Same as in EXAMPLE 1 | | | Sampe as in EXAMPLE 1 | | |
| Amount of 1,4-diaminoanthraquinone-2,3-disulfonic acid obtained | 7.32 parts | 7.11 parts | 7.11 parts | 7.10 parts | 7.10 parts | |
| Purity | 87.7% | 87.3% | 87.3% | | 87.3% | 87.3% |
| Operation for recovery of quaternary compound | Same as in EXAMPLE 1 | | | Same as in EXAMPLE 1 | | |
| Amount of recovered oil layer | 83.1 parts | | | 109 parts | | |
| Content of quaternary compound | 68.0% | | | 65.0% | | |

| EXAMPLE NO. | 33 | 34 | 35 | 36 | 37 | 38 |
|---|---|---|---|---|---|---|
| Quaternary compound | Hexadecyltriethylphosphonium chloride | Hexadecyltriethylphosphonium chloride (oil layer recovered in EXAMPLE 33) | Hexadecyltriethylphosphonium chloride (oil layer recovered in EXAMPLE 43) | Benzyltriethylphosphonium bromide | Benzyltriethylphosphonium bromide (oil layer obtained in EXAMPLE 36) | Benzyltriethylphosphonium bromide (aqueous layer obtained in EXAMPLE 45) |
| Amount | 50 parts | 74.6 parts | 74.6 parts | 25 parts | 34.2 parts | 35.0 parts |
| Water | 50 parts | 25.4 parts | 25.4 parts | 25 parts | 15.8 parts | 15 parts |
| Starting material | 1,4-diamino-2,3-dibromoanthraquinone (purity 92.1%) | | | 1,4-diamino-2,3-dichloroanthraquinone (purity 90.9%) | | |
| Amount | 7.00 parts | | | 5.50 parts | | |
| Sulfonating agent | Anhydrous potassium sulfite | | | Anhydrous sodium sulfite | | |
| Amount | 8.0 parts | | | 7.18 parts | | |
| Reaction temp. (°C.) | 85–90 | | | 90–95 | | |
| Pressure (Torr) | 300–320 | | | 350–380 | | |
| Reaction time | 10 hours | | | 6 hours | | |
| Amount of distilled water | 60 parts (N₂ gas was blown into and water was supplied at this rate) | | | 15 parts (N₂ gas was blown into and water in an amount corresponding to the distilled amount was supplied) | | |
| Cyanogenation After-treatments | Same as in EXAMPLE 1 | | | Same as in EXAMPLE 1 | | |
| Amount of 1,4-diaminoanthraquinone-2,3-disulfonic acid obtained | 7.31 parts | 7.11 parts | 7.11 parts | 7.24 parts | 7.00 parts | 7.00 parts |
| Purity | 87.7% | 87.3% | 87.3% | 87.5% | 87.1% | 87.1% |
| Operation for recovery of quaternary compound | Same as in EXAMPLE 1 | | | Same as in EXAMPLE 1 | | |
| Amount of recovered oil layer | 70.9 parts | | | 32.8 parts | | |
| Content of quaternary compound | 67.0% | | | 73.2% | | |

| EXAMPLE NO. | 39 | 40 | 41 | 42 |
|---|---|---|---|---|
| Quaternary compound | Benzyltrimethylammonium chloride | Benzyltrimethylammonium chloride (oil layer recovered in EXAMPLE 39) | Tetra-n-butylammonium bromide | Tetra-n-butylammonium bromide (oil layer recovered in EXAMPLE 41) |
| Amount | 59.5 parts | 88.4 parts | 78.7 parts | 121.0 parts |
| Water | 48.7 parts | 19.8 parts | 42.3 parts | 0 |
| Starting material | 1,4-diamino-2,3-dichloroanthraquinone (purity 90.9%) | | 1,4-diamino-2,3-dichloroanthraquinone (purity 90.9%) | |

-continued

| | | | | |
|---|---|---|---|---|
| Amount | 5.50 parts | | 5.50 parts | |
| Sulfonating agent | Anhydrous sodium sulfite | | Anhydrous sodium sulfite | |
| Amount | 5.7 parts | | 7.18 parts | |
| Reaction temp. (°C.) | 80–85 | | 90–95 | |
| Pressure (Torr) | 240–270 | | 300–320 | |
| Reaction time | 18 hours | | 12 hours | |
| Amount of distilled water | 58.5 parts (water was supplied at the same rate) | | 65 parts (water was supplied at the same rate) | |
| Cyanogenation After-treatments | Same as in EXAMPLE 3 | | Same as in EXAMPLE 5 | |
| Amount of 1,4-diaminoanthraquinone-2,3-disulfonic acid obtained | 4.65 parts | 4.52 parts | 4.47 parts | 4.31 parts |
| Purity | 93.3% | 93.3% | 93.3% | 93.0% |
| Operation for recovery of quaternary compound | Same as in EXAMPLE 3 | | Same as in EXAMPLE 5 | |
| Amount of recovered oil layer | 83.1 parts | | 115.0 parts | |
| Content of quaternary compound | 67.3% | | 65.0% | |

| EXAMPLE NO. | 43 | 44 | 45 | 46 |
|---|---|---|---|---|
| Quaternary compound | Hexadecyltriethylphosphonium chloride | Hexadecyltriethylphosphonium chloride (oil layer recovered in EXAMPLE 44) | Benzyltriethylphosphonium bromide | Benzyltriethylphosphonium bromide (oil layer recovered in EXAMPLE 45) |
| Amount | 50 parts | 74.6 parts | 25 parts | 35.0 parts |
| Water | 50 parts | 25.4 parts | 25 parts | 15.0 parts |
| Starting material | 1,4-diamino-2,3-dibromoanthraquinone (purity 92.1%) | | 1,4-diamino-2,3-dichloroanthraquinone (purity 90.0%) | |
| Amount | 7.00 parts | | 5.50 parts | |
| Sulfonating agent | Anhydrous potassium sulfite | | Anhydrous sodium sulfite | |
| Amount | 8.0 parts | | 7.18 parts | |
| Reaction temp. (°C.) | 85–90 | | 90–95 | |
| Pressure (Torr) | 300–320 | | 350–380 | |
| Reaction time | 10 hours | | 6 hours | |
| Amount of distilled water | 60 parts ($N_2$ gas was blown into and water was supplied at the same rate as distillation rate) | | 15 parts ($N_2$ gas was blown into and water in an amount corresponding to the distilled amount was supplied) | |
| Cyanogenation After-treatments | Same as in EXAMPLE 3 | | Same as in EXAMPLE 5 | |
| Amount of 1,4-diaminoanthraquinone-2,3-disulfonic acid obtained | 4.55 parts | 4.42 parts | 4.66 parts | 4.51 parts |
| Purity | 93.0% | 93.2% | 93.1% | 93.3% |
| Operation for recovery of quaternary compound | Same as in EXAMPLE 3 | | Same as in EXAMPLE 5 | |
| Amount of recovered oil layer | 70.9 parts | | 33.2 parts | |
| Content of quaternary compound | 67.0% | | 71.5% | |

We claim:

1. A process for producing 1,4-diaminoanthraquinone-2,3-disulfonic acid, which comprises reacting 1,4-diamino-2,3-dihalogenoanthraquinone in water with a sulfonating agent in the presence of at least one quaternary compound selected from quaternary ammonium compounds and quaternary phosphonium compounds, while removing water out of the reaction system.

2. The process according to claim 1, wherein the dihalogenoanthraquinone is 1,4-diamino-2,3-dichloro or dibromoanthraquinone.

3. The process according to claim 1, wherein the sulfonating agent is an alkali metal sulfite or hydrogensulfite.

4. The process according to claim 1, wherein the sulfonating agent is used in an amount of 2 to 5 moles per mol of the dihalogenoanthraquinone.

5. The process according to claim 1, wherein the quaternary ammonium compound is one represented by the following formula (I) or (II),

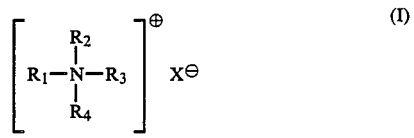

wherein $R_1$ and $R_2$ each represents an alkyl group having 1 to 24 carbon atoms or an unsubstituted or substituted benzyl group, $R_3$ and $R_4$ each represents an alkyl group having 1 to 10 carbon atoms, and X represents an anion residue,

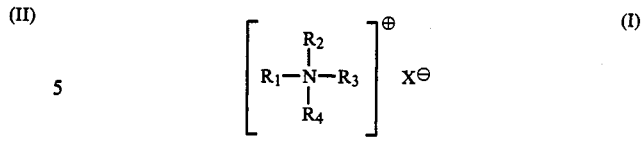

wherein $R_1$ and $R_2$ each represents an alkyl group having 1 to 24 carbon atoms or an unsubstituted or substituted benzyl group, $R_3$ and $R_4$ each represents an alkyl group having 1 to 10 carbon atoms, and X represents an anion residue,

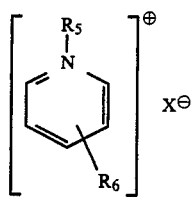

wherein $R_5$ represents an alkyl group having 1 to 24 carbon atoms, $R_6$ represents a hydrogen atom or a methyl group and X has the same meaning as above.

6. The process according to claim 1, wherein the quaternary phosphonium compound is one represented by the following formula (III),

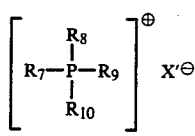

wherein $R_7$ represents an alkyl group having 1 to 24 carbon atoms, a phenyl group or a benzyl group, and $R_8$, $R_9$ and $R_{10}$ represent an alkyl group having 1 to 24 carbon atoms or a phenyl group, and X' represents an anion residue.

7. The process according to claim 1, wherein the quaternary compound is used in an amount of 2 to 90% by weight based on the total weight of water and the quaternary compound.

8. The process according to claim 1, wherein the total amount of water and the quaternary compound is 2 to 30 times the weight of the dihalogenoanthraquinone.

9. The process according to claim 1, wherein the partial water-removing is carried out at a rate of 1 part by weight or more per hour based on 1000 parts by weight of the total weight of water and the quaternary compound.

10. The process according to claim 1, wherein the sulfonation reaction is carried out at a temperature higher than 50° C.

11. A process for producing 1,4-diaminoanthraquinone-2,3-dinitrile, which comprises subjecting 1,4-diamino-2,3-dihalogenoanthraquinone in water with a sulfonating agent in the presence of at least one quaternary compound selected from quaternary ammonium compounds and quaternary phosphonium compounds, while removing water out of the reaction system, and subjecting the reaction mixture containing 1,4-diaminoanthraquinone-2,3-disulfonic acid and the quaternary compound to cyanogenation reaction with a cyanogenating agent.

12. The process according to claim 11, wherein the dihalogenoanthraquinone is 1,4-diamino-2,3-dichloro or dibromoanthraquinone.

13. The process according to claim 1, wherein the sulfonating agent is an alkali metal sulfite or hydrogensulfite.

14. The process according to claim 11, wherein the sulfonating agent is used in an amount of 2 to 5 moles per mol of the dihalogenoanthraquinone.

15. The process according to claim 11, wherein the quaternary ammonium compound is one represented by the following formula (I) or (II),

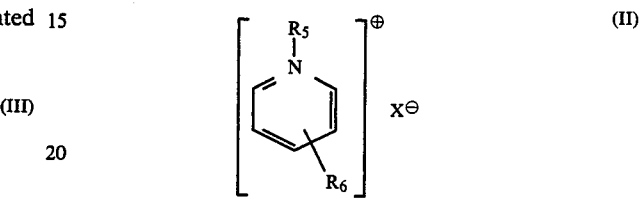

wherein $R_5$ represents an alkyl group having 1 to 24 carbon atoms, $R_6$ represents a hydrogen atom or a methyl group and X has the same meaning as above.

16. The process according to claim 11, wherein the quaternary phosphonium compound is one represented by the following formula (III),

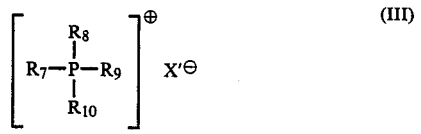

wherein $R_7$ represents an alkyl group having 1 to 24 carbon atoms, a phenyl group or a benzyl group, and $R_8$, $R_9$ and $R_{10}$ represent an alkyl group having 1 to 24 carbon atoms or a phenyl group, and X' represents an anion residue.

17. The process according to claim 11, wherein the quaternary compound is used in an amount of 2 to 90% by weight based on the total weight of water and the quaternary compound.

18. The process according to claim 11, wherein the total amount of water and the quaternary compound is 2 to 30 times the weight of the dihalogenoanthraquinone.

19. The process according to claim 11, wherein the partial water-removing is carried out at a rate of 1 part by weight or more per hour based on 1000 parts by weight of the total weight of water and the quaternary compound.

20. The process according to claim 11, wherein the sulfonation reaction is carried out at a temperature higher than 50° C.

21. The process according to claim 11, wherein the cyanogenating agent is a cyanide of an alkali metal, alkaline earth metal or ammonium or a cyanohydrin.

22. The process according to claim 11, wherein the cyanogenation reaction is carried out at a pH ranging from 8 to 11.

23. The process according to claim 11, wherein the cyanogenation reaction is carried out at a temperature of 40° to 100° C.

* * * * *